Patented July 30, 1940

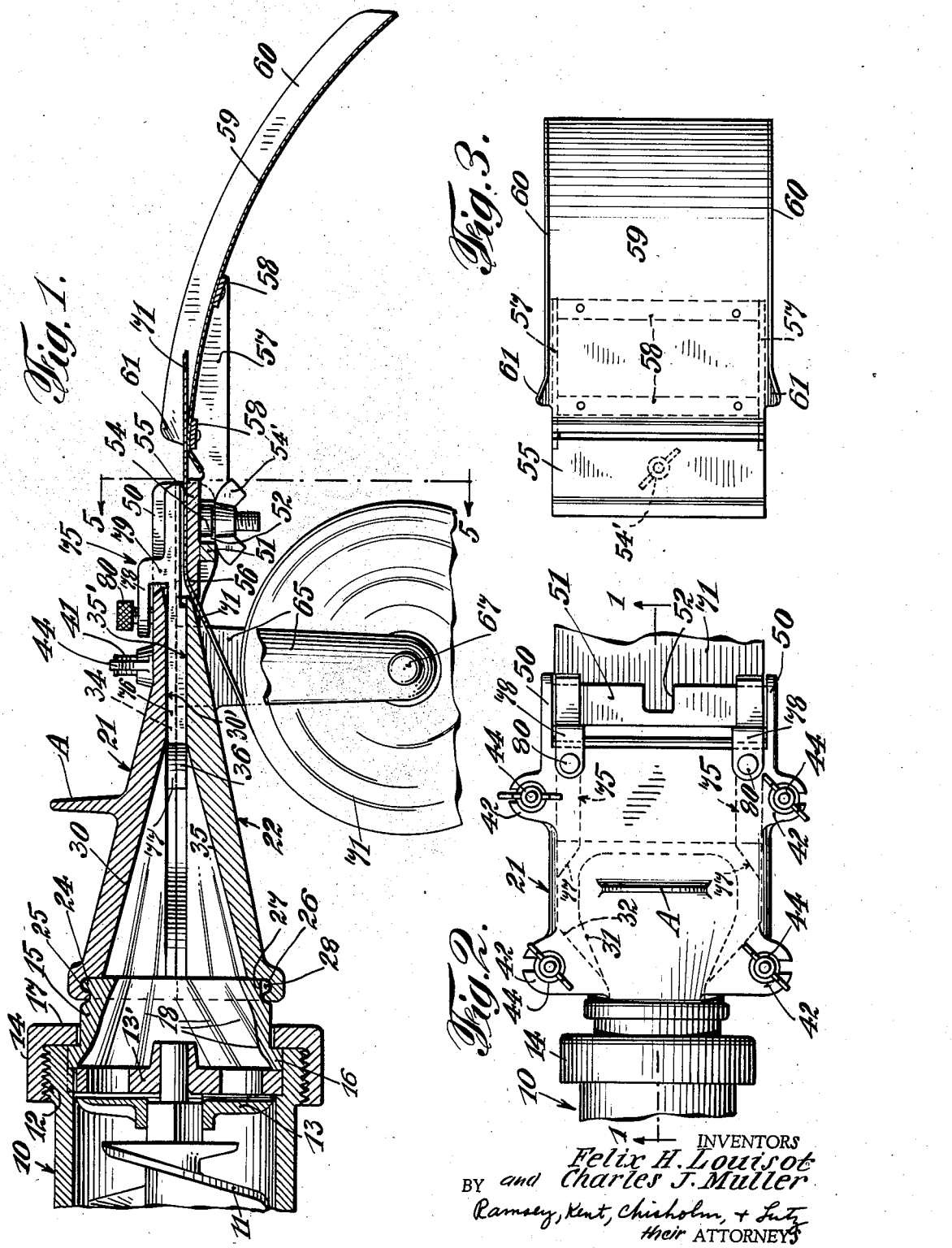

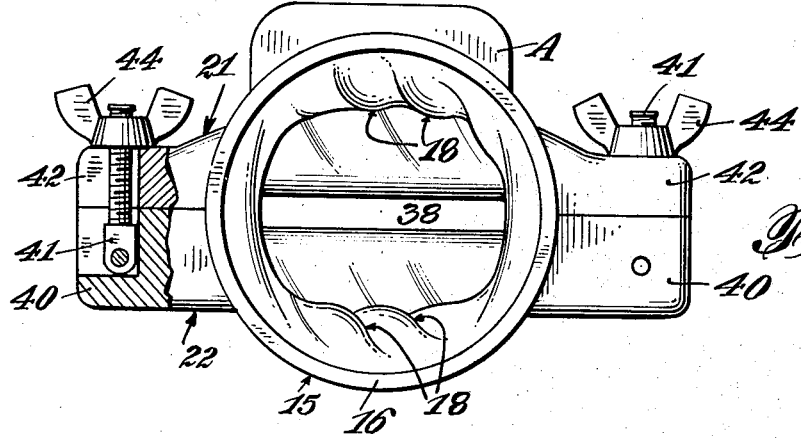
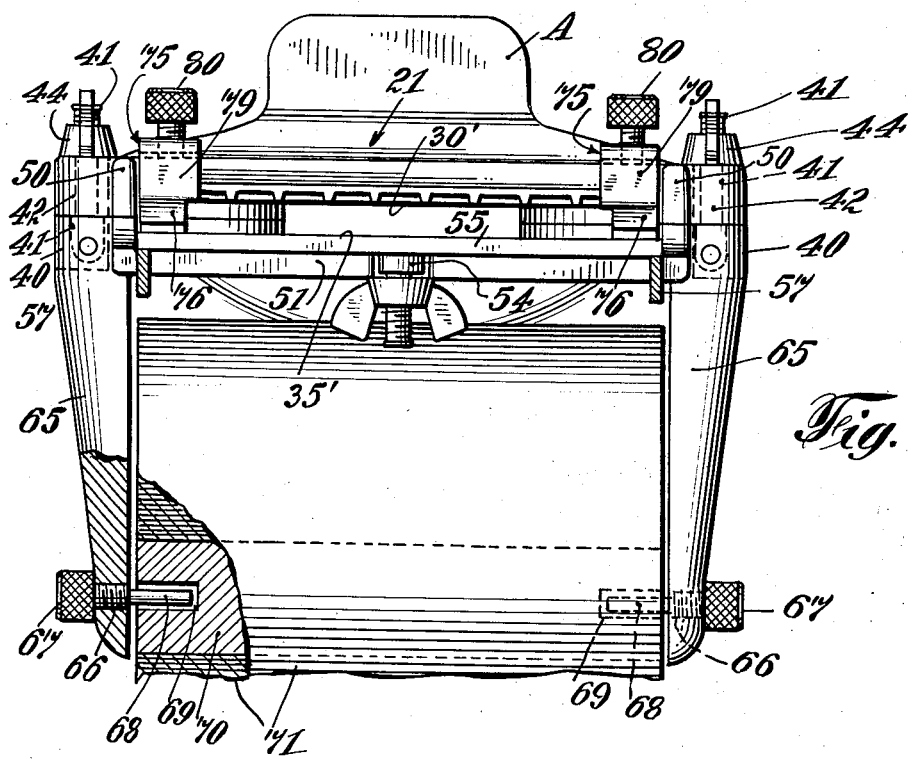
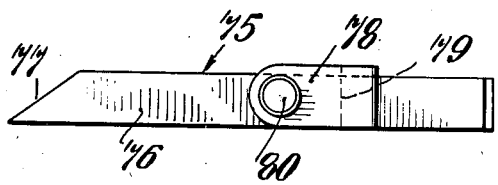

2,209,824

UNITED STATES PATENT OFFICE 2,209,824

MECHANISM FOR PROCESSING MEAT PRODUCTS

Felix H. Louisot and Charles J. Muller, Hasbrouck Heights, N. J.

Application June 25, 1937, Serial No. 150,240

7 Claims. (Cl. 17—32)

This invention relates to means for preparing meat and fat products.

In the preparation of certain meats for cooking, it is customary to wrap a mass of flattened fat around the meat and to tie the fat in place with cord. The practice of butchers at the present time in obtaining the slabs needed for wrapping around meat is to pound a lump of fat either with a meat cleaver or with a wooden mallet until the desired thickness is obtained. Such pounding naturally results in a more or less irregular mass or slab of fat which is seldom of uniform thickness or width so that difficulty is experienced in wrapping the slab around the meat. The fat, of course, is trimmed to fit the meat and the trimmed parts used to fill in vacant spaces, with resultant loss of uniformity in the wrapping and loss in appearance. With this present practice, only certain portions of the fat known as cod fat can be used, so that a considerably quantity of fat such as trimmings, scraps, waste, etc. cannot be used for this or any other advantageous purpose.

The fundamental principles of the present invention have been disclosed in our copending application Serial No. 746,071, filed September 29, 1934, now Patent No. 2,085,108, dated June 29, 1937, for Meat products and means for and methods for producing the same, of which application this application is a continuation in part.

An object of the invention is to provide a mechanism for shaping fat or other meat products into a strip of substantially uniform thickness and substantially uniform width.

Another object of the invention is to provide a shaping device which can be attached to a part of a conventional meat grinder, such shaping device consisting in part of a funnel having an outlet opening which is of substantially rectangular shape in cross-section.

A further object of the invention is to provide means within the funnel for causing the fibres passing therethrough to be crossed in the ultimate strip.

A still further object of the invention is to provide in conjunction with a funnel, a passageway for meat products so shaped as to cause the meat products to assume a strip form, such passageway being constructed to permit the size thereof to be varied.

In carrying out the invention and particularly in its relation to the processing of animal fat, the mechanism utilized consists of the usual conveyor screw of a meat grinding machine to the end of the casing of which is secured a truncated funnel ring leading into a partially tapered passageway. The tapered part of the passageway is also flared outwardly and is in communication with a portion of the passageway which is substantially rectangular when considered in cross-section. This passageway is made up of a lower and an upper section, the lower section having a floor and upstanding side walls, while the upper section has a top and depending side walls. Sections having depending side walls of varying dimensions can be utilized to change the height of the passageway, and accordingly sections are preferably removably secured to the funnel, so that they can be interchanged with other matched sections to vary the width as well as the height of the resultant strip. The funnel is provided with guiding ribs or vanes formed in the upper and lower inner surfaces thereof and inclined in such direction that meat products passing through the funnel will be given opposite directional movement so that where the meat products are fibrous in nature the fibres in effect will be crossed in the finished strip.

Provision is made for attaching an inclined delivery chute or slideway to a part of the lower section, such chute forming a continuation of the path of travel of processed material.

In some instances, it will be desirable to have the finished strip resting on waxed paper, or other suitable paper, and for this purpose an opening is provided in the lower section of the passageway through which a strip of paper from a roll may pass. This paper is fed under the emerging strip of meat products so that as this strip passes along the extension of the lower section it rests upon the paper strip, and due to the adhesion between the meat and the paper strip, the paper strip advances with the meat strip.

While the mechanism previously described has been designed primarily for the treatment of fat, it will be evident of course that other meat products can be processed thereby, and particularly ground meat products, such as hamburger meat, etc., can be processed with facility. The hamburger meat emerging from the shaping passageway can be cut into suitable lengths and each section will have an undercoating of sanitary paper to aid in the handling or preparation of meat for sandwiches.

Other features, objects and advantages of the invention will become apparent by reference to the following detailed description taken in conjunction with the accompanying drawings, wherein Fig. 1 is a vertical section taken on the line 1—1 of Fig. 2 of mechanism for processing meat products;

Fig. 2 is a fragmentary plan view of the same;

Fig. 3 is a plan view of the detachable chute;

Fig. 4 is an end view of the mechanism;

Fig. 5 is a section substantially on the line 5—5 of Fig. 1; and

Fig. 6 is a plan view of a detachable filler member.

Referring now to the drawings, 10 indicates a cylindrical housing for the feed screw 11 of an ordinary meat chopping machine. The housing 10 has external threads 12 at one end thereof to be engaged by the threads of a retaining ring 14 which normally serves to hold chopping blades 13 and cooperating apertured plate 13' to the end of the housing.

Secured in the end of the housing 10 by means of the ring 14 is a funnel 15 illustrated in the drawings as being made in the form of a ring-like member with tapering inner walls. This funnel 15 fits against the plate 13' and is provided with a flange 16 engaged by the annular flange 17 of the retaining ring 14 to lock the funnel to the housing. The mouth of the funnel as shown clearly in Fig. 4 is substantially circular in cross-section, but the wall of the funnel tapers to provide a discharge opening of modified oval shape as shown in Fig. 4. The upper and lower inner surfaces of the funnel are provided with inclined ribs or vanes 18, the purpose of which will be explained in describing the operation of the device.

In communication with the funnel 15 is a passageway made up of upper member 21 and lower member 22. These members are so shaped that, when they are clamped together in a manner to be described later, they will provide an inlet to the passageway corresponding substantially to the shape of the outlet of funnel 15, but of slightly larger size. As will be seen from an inspection of the drawings the two members 21 and 22 are shaped to provide a complete encircling casing fitting around the end of the funnel 15. This funnel has a peripheral bead 24 which fits into annular recesses 25 and 26 in the respective members 21 and 22. If desired, the bead 25 may have a small notch 27 cut therein to receive a small lug 28 formed in the recess 26; these parts serving to properly register the assembled parts and to prevent relative rotation between the funnel and the parts 21 and 22.

The upper member 21 is so shaped as to provide a tapered inner wall 30 which is also flared outwardly into a flat surface 30' between the dotted lines 31 and 32 and extending to one end of member 21. This flat surface as will be seen extends for approximately a third of the length of the member and a depending side wall 34 acts as a limiting wall therefor. The lower member 22 is similarly shaped having an inclined inner wall 35 extending into a flat surface 35', and having upstanding side walls 36 cooperating with the walls 34 to provide in the outlet end of the device a channel which is of substantially rectangular shape in cross-section as indicated clearly at 38 in Fig. 4.

The lower member 22 is provided with outwardly extending ears 40 slotted for the reception of bolts 41 pivotally mounted therein. The upper member 21 is provided with corresponding slotted ears 42. The bolts 41 can be swung into vertical position and the two members 21 and 22 locked together by wing nuts 44.

The side edges of the lower member 22 are extended beyond the end of the flat surface 35' thereof as shown at 50 and these extensions are spanned by a cross-bar 51, the upper surface of which is spaced a slight distance below the surface of the flat part 35'. This cross-bar is also spaced longitudinally from the end of the flat surface 35'. A notch 52 in the cross-bar serves to receive a stud 54 extending downwardly from a chute frame member 55. A wing nut 54' serves to lock the member 55 to the cross bar 51. This frame member 55 is in the nature of a bar or plate of such thickness that when it is positioned on top of the cross-bar 51 the upper surface of the member 55 is substantially in alignment with the flat surface 35'. It should be noted, however, that one lateral edge of the member 55 is beveled off as at 56 in such fashion that a narrow slot exists between this member 55 and the end of member 22. The chute plate 55 has oppositely disposed extension bars 57 spanned by cross-bars 58. A curved chute 59 of some suitable thin material (preferably metal) is secured to the top surfaces of the bars 58 and the top edges of the extensions 57. This chute 39 has upstanding side walls 60, which may be flared out slightly as shown at 61 in Fig. 3.

Depending from the member 22 are a pair of oppositely disposed posts 65 each having a threaded aperture 66 therein near the lower end thereof. These apertures serve to receive headed bolts 67, the ends of which are in the form of short pins 68 adapted to fit in recesses 69 in a spool 70 on which paper 71 is rolled. Due to the positioning of these posts 65, it follows that the paper 71 can be fed from the roll through the slot between the surface 56 and the end of member 22 to pass over the top of the chute plate 55 to receive meat products as they emerge from the shaping passageway formed by the members 21 and 22.

In the event it is desired to reduce the width of shaping passageway use may be made of one or two filler members indicated generally at 75. Each member is in the form of a bar 76 having one end tapered as at 77. Formed integrally with the bar 76 is a bar 78 arranged in parallelism to the bar 76 and joined thereto by a short connection 79. A threaded aperture is provided in the bar 78 for the passage of a headed bolt 80 which serves to lock the filler in place with the bar 76 inserted in the shaping passageway and with the bar 78 positioned above the top of the surface of the upper member 21. Two such fillers have been shown in dotted lines in Fig. 2. For convenience in handling, upper member 21 which may be made in different sizes, this member is provided with a handle portion indicated at A.

The use and operation of the device is substantially as follows: When it is desired to produce strips of fat for wrapping around meat to be cooked, any of the fat, and particularly that fat known in the art as cod fat, trimmings, scraps, and waste is fed to the feed screw of the machine in the usual fashion. The fat may be in lumps, strips, or in any other shape. If desired the cutter 13 and plate 13' may be omitted while fat is being processed. The feed screw in pushing the fat through the housing 10 works the separate pieces into a more or less homogeneous mass. The screw finally pushes the mass into the funnel, and, as is usual in these types of devices, the mass travels more or less in a straight line with very little rotary movement. As the result of being forced into the funnel, the mass of fat is in effect extruded therefrom through the outlet opening. As this mass moves through the funnel the guiding vanes or ribs 18 serve to impart cross directional movement to the upper and lower parts of the mass so that in effect the upper part of the fat passing through the outlet is crossed over the lower part. Since animal fat is fibrous by nature, the result will be that the fibres will more or less be crossed, aiding in holding the strip together. In fact, in practice, it has been found that the absence of the inclined guiding ribs or vanes results in a much inferior product. When the fat passes through the outlet opening of the funnel it immediately enters the shaping passageway defined by the upper and lower members 21 and 22, and expands to fill this passageway, which, in almost its entirety, is wider than the funnel, filling the passageway, after which it is forced through and out of this passageway.

The fat emerging from the passageway is in the nature of a strip of substantially uniform width and substantially uniform thickness in which the fibres are crossed from top to bottom, as set forth in our copending application before identified.

If desired the emerging strip of fat may be provided with an underlayer of paper fed from the roll 70 through the opening before described. The strip of fat either with or without the paper underlayer slides over the end of the bottom member of the shaping passageway onto the chute or slideway 59. This strip may be permitted to continue indefinitely or may cut off any desired lengths by means of any suitable knife.

The strip so processed has been found in practice to be a strip admirably suited for wrapping roasts. The uniform size of the strip aids materially in the wrapping, and in addition, since all types of fat can be made use of, the result is that more roasts can be wrapped with fat than under prior practice. Waste consequently is materially reduced.

This mechanism of course, is not limited to the processing of fat, since other meat products can be worked with facility. For example, ground meat products, such as hamburger meat, etc., may be fed through the funnel by the feed screw in the same manner and with the same results, namely, that a strip of ground meat will emerge from the shaping passageway and will be delivered to the slideway. If the meat is being prepared for sandwiches, suitable lengths of the strip can be cut off as the strip passes onto the slideway. For longer lengths, the paper may be marked to indicate desired dimensions. In this phase of the invention, particularly preparing meat for sandwiches, the provision of the sanitary paper to underlie each section of the strip is of importance, since such underlayer of paper cut off simultaneously with the section of the strip permits the meat to be handled without the hands of the preparer actually touching the same.

While the shaping passageway has been illustrated as being of greater width than that of the funnel, it will be apparent that this passageway may have the same width or if desired may even have a narrower width. The width can be varied by removing the two sections of this shaping passageway and substituting therefor two other matched sections of the desired width. Also fillers 75 may be utilized to decrease the width of the passageway if desired. In the event it is desired to change the thickness of the resultant strip, such change may be accomplished by removing the top member of the passageway and substituting therefor another member which has shorter side walls 34, which in turn cause the top of this member to be closer to the bottom of the lower member. Various combinations of matched parts of the passageway may be utilized without departing from the spirit of the invention.

From the foregoing, it will be seen that the present invention provides new mechanism for processing fat and meat products. The invention is capable of modification, in view of which it is not to be limited by the illustrated embodiment but is to be limited only by the scope of the following claims.

We claim:

1. Apparatus of the character described comprising a tapered-wall funnel leading into a passageway having a restricted outlet substantially rectangular in cross section, mechanism for feeding a mass of meat to the inlet end of said funnel, said funnel being provided with internal substantially longitudinally extending upper and lower series of slightly longitudinally inclined vanes for imparting directional effects to the meat passing through the funnel and for crossing the fibres of said meat.

2. Apparatus of the character described comprising a tapered-wall funnel having a restricted outlet, mechanism for feeding a mass of meat to the inlet end of said funnel, said funnel being provided with internal substantially longitudinally extending upper and lower series of slightly longitudinally inclined vanes for imparting directional effects to the meat passing through the funnel and for crossing the fibres of said meat, and an elongated passage having an outlet portion of substantially rectangular cross section secured to said funnel to receive the meat emerging from the outlet of the funnel.

3. Apparatus of the character described comprising a funnel having a restricted outlet, mechanism for feeding a mass of meat to the inlet end of said funnel, said funnel being provided with internal upper and lower series of inclined vanes for imparting directional effects to the meat passing through the funnel, and an elongated passageway having an outlet portion of substantially rectangular cross section secured to said funnel to receive the meat emerging from the outlet of the funnel, the bottom of said passageway having an extension, said extension having a slot therein for the passage of a strip of paper into position underlying the strip of moving meat.

4. Apparatus of the character described comprising a tapered-wall funnel having a substantially circular inlet and having a substantially oval shaped outlet, and mechanism for feeding a mass of meat to the inlet of said funnel, said funnel being provided with substantially longitudinally extending upper and lower series of internal slightly longitudinally inclined vanes for imparting directional effects to the meat passing through the funnel and for crossing the fibres of said meat.

5. Apparatus of the character described comprising a tapered-wall funnel having a substantially circular inlet and having an outlet, mechanism for feeding a mass of meat to the inlet of said funnel, said funnel being provided with substantially longitudinally extending upper and lower series of internal slightly longitudinally inclined vanes for imparting directional effects to the meat passing through the funnel and for crossing the fibres of said meat, and an elongated passageway tapering to a portion of substantially rectangular cross section, said passageway being removably secured to said funnel to receive meat emerging from the outlet thereof.

6. Apparatus of the character described comprising a cylindrical screw casing, a feed screw rotatably mounted in said casing, an extruding funnel removably secured to the end of said screw casing, a housing secured to said funnel and providing a passageway having an outlet portion of substantially rectangular cross section, said funnel being provided with an outlet leading into said passageway, and a downwardly curved chute removably secured to the end of said passageway to form a prolongation of the floor thereof.

7. Apparatus of the character described comprising a cylindrical screw casing, a feed screw rotatably mounted in said casing, an extruding funnel removably secured to the end of said screw casing, a housing secured to said funnel and providing a passageway having an outlet portion of substantially rectangular cross section, said funnel being provided with an outlet leading into said passageway, a delivery chute removably secured to the end of said passageway to receive the strip of material emerging from said passageway, and means for feeding strip material onto the surface of said chute to underlie the matter emerging from said passageway.

FELIX H. LOUISOT.
CHARLES J. MULLER.